(12) United States Patent
Moriyama et al.

(10) Patent No.: US 7,473,292 B2
(45) Date of Patent: Jan. 6, 2009

(54) AIR CLEANER

(75) Inventors: Hiroshi Moriyama, Wako (JP); Toru Taniguchi, Wako (JP)

(73) Assignee: Honda Motor Co., Ltd. (JP)

( * ) Notice: Subject to any disclaimer, the term of this patent is extended or adjusted under 35 U.S.C. 154(b) by 469 days.

(21) Appl. No.: 11/248,871

(22) Filed: Oct. 12, 2005

(65) Prior Publication Data

US 2006/0080949 A1 Apr. 20, 2006

(30) Foreign Application Priority Data

Oct. 15, 2004 (JP) .............................. 2004-301994

(51) Int. Cl.
*B01D 46/42* (2006.01)
(52) U.S. Cl. .............................. 55/502; 55/481; 55/493; 55/498; 55/385.3; 55/497; 55/500; 55/503; 123/198 E
(58) Field of Classification Search ................ 55/385.3, 55/481, 493, 498, 502, 497, 500, 503; 123/198 E
See application file for complete search history.

(56) References Cited

U.S. PATENT DOCUMENTS

| | | | | |
|---|---|---|---|---|
| 5,569,311 A | * | 10/1996 | Oda et al. ...................... 55/493 |
| 5,605,554 A | * | 2/1997 | Kennedy ...................... 55/493 |
| 5,730,768 A | * | 3/1998 | Kaminaga et al. ........... 55/385.3 |
| 5,902,361 A | * | 5/1999 | Pomplun et al. ............ 55/385.3 |
| 6,159,260 A | * | 12/2000 | Hammes ....................... 55/502 |
| 6,217,627 B1 | * | 4/2001 | Vyskocil et al. .............. 55/492 |
| 6,231,630 B1 | * | 5/2001 | Ernst et al. ................. 55/385.3 |
| 6,293,984 B1 | * | 9/2001 | Oda et al. ..................... 55/497 |
| 6,508,851 B2 | * | 1/2003 | Goerg ....................... 55/385.3 |

FOREIGN PATENT DOCUMENTS

DE 2061411 6/1972
JP 10252585 9/1998

OTHER PUBLICATIONS

Patent Abstracts of Japan vol. 1998, No. 14, Dec. 31, 1998, publication No. 10252585, publication date Sep. 22, 1998.

* cited by examiner

*Primary Examiner*—Jason M Greene
*Assistant Examiner*—Minh-Chau T Pham
(74) *Attorney, Agent, or Firm*—Adams & Wilks (57) ABSTRACT

An air cleaner has a casing body having an opening that communicates with a carburetor. The casing body includes a fitting part having an inner wall surface and a bearing surface. A sealing frame is inserted into the casing body and engages the fitting part of the casing body. The sealing frame has an outer peripheral part with an outer peripheral surface that is held in contact with the inner wall surface of the fitting part, a rear surface that is held in contact with the bearing surface of the fitting part, a front surface, and a groove formed in the front surface along a circumference thereof. A filter is disposed internally of the sealing frame. A cover covers the filter and the sealing frame.

20 Claims, 6 Drawing Sheets

FIG. 5B
(COMP. EX.)

FIG . 6
(PRIOR ART)

AIR CLEANER

FIELD OF THE INVENTION

The present invention relates to an improvement in an air cleaner for use on a multi-purpose engine.

BACKGROUND OF THE INVENTION

An air cleaner is a part for filtering air containing dust and supplying filtered clean air to an engine. For the purpose of maintenance, a filter for filtering air is detachably attached to a casing forming a body of the air cleaner. When the filter is attached to the casing with a gap left between the filter and the casing, air containing dust is likely to enter through the gap into a carburetor on an engine side. To this end, JP-A-10-252585, for example, proposes an air cleaner with a sealing frame of an elastic material interposed between a casing and a filter, leaving no gap therebetween. The proposed air cleaner arrangement will now be described with reference to FIG. 6 hereof.

Figure 6:
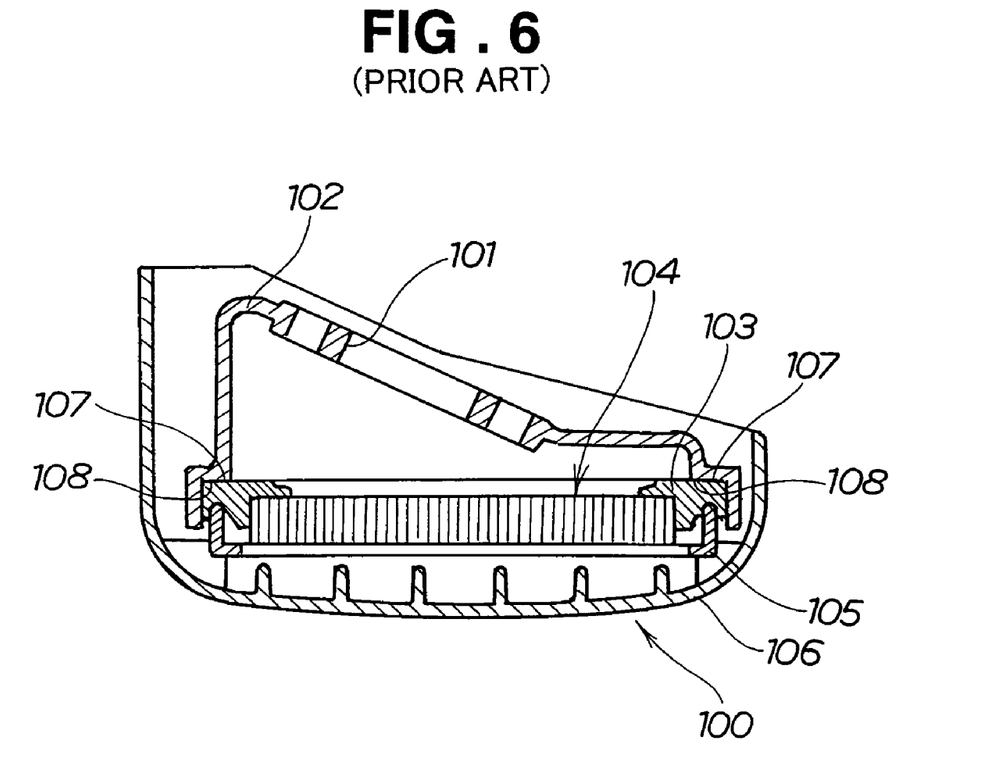
FIG. 6 is a cross-sectional view showing a conventional air cleaner.

As shown in FIG. 6, the conventional air cleaner 100 is comprised of a casing 102 with a communication hole (101) communicating with a carburetor, not shown, a sealing frame 103 made of a elastic material and fitted in the casing 102, a filter 104 engaged with the sealing frame 103, a backup frame 105 for supporting the filter 104, and a cover 106 for securing the backup frame 105. The backup frame 105 presses the sealing frame 103 against the casing 102 to thereby prevent dust from passing between the sealing frame 103 and the casing 102.

However, the conventional air cleaner has a drawback in that the casing 102 is likely to have dimension errors that lead to distortion in a bearing surface 108 of the sealing frame 103. Similarly, the backup frame 105 and the cover 106 are likely to have dimension errors that result in a shortage in the pressing force of the backup frame 105 against the sealing frame 103. Such distortion and pressing force shortage will give rise to a gap 107 between the casing 102 and the sealing frame 103, thus deteriorating a sealing effect between them. Consequently, there is a demand for an improvement in a sealing effect between the sealing frame and the casing.

SUMMARY OF THE INVENTION

According to the present invention, there is provided an air cleaner which comprises: a casing body having an opening communicating with a carburetor; a sealing frame designed to be engaged in a fitting part of the casing body; a filter disposed internally of the sealing frame; and a cover for covering the filter and the sealing frame, wherein the sealing frame has a front surface, a rear surface and an outer peripheral surface, the fitting part has an inner wall surface held in contact with an outer peripheral surface of the sealing frame, and a bearing surface held in contact with the rear surface of the sealing frame, and the sealing frame has a groove extending along the outer peripheral surface and opening on the front surface.

Since the sealing frame is provided with the groove extending along its outer peripheral surface and opening on its front surface so that the outer peripheral surface of the sealing frame can easily bends toward the filter, the outer peripheral surface of the sealing frame contacts the inner wall surface of the casing body and, while bending, moves on the inner wall surface of the casing body. As a result, it becomes possible to place the rear surface of the sealing frame in pressed contact with the bearing surface of the fitting part. Consequently, increased sealing is established between the casing body and the sealing frame and the releasable attachment capability of the sealing frame is increased. Placing the filter in tight contact with the inside of the sealing frame to make them unitarily coupled not only produces an improved sealing effect between the casing body and the filter but also facilitates releasable attachment of the filter.

Further, because the outer peripheral part defined by the groove provided in the sealing frame elastically deforms, a releasable attachment operation for the sealing frame becomes easy.

Preferably, the outer peripheral surface of the sealing frame is tapered such that the rear surface of the sealing frame has a diameter smaller than a diameter of an inlet part of the fitting part and the front surface of the sealing frame has a diameter larger than a diameter of the inlet part of the fitting part. With this arrangement, it becomes possible for the sealing frame to easily engage in the casing body. Further, the outer peripheral part defined by the groove easily deforms elastically as deep as the diameter of the inlet part of the fitting part to thereby perform a spring function, thus providing an improved sealing effect.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
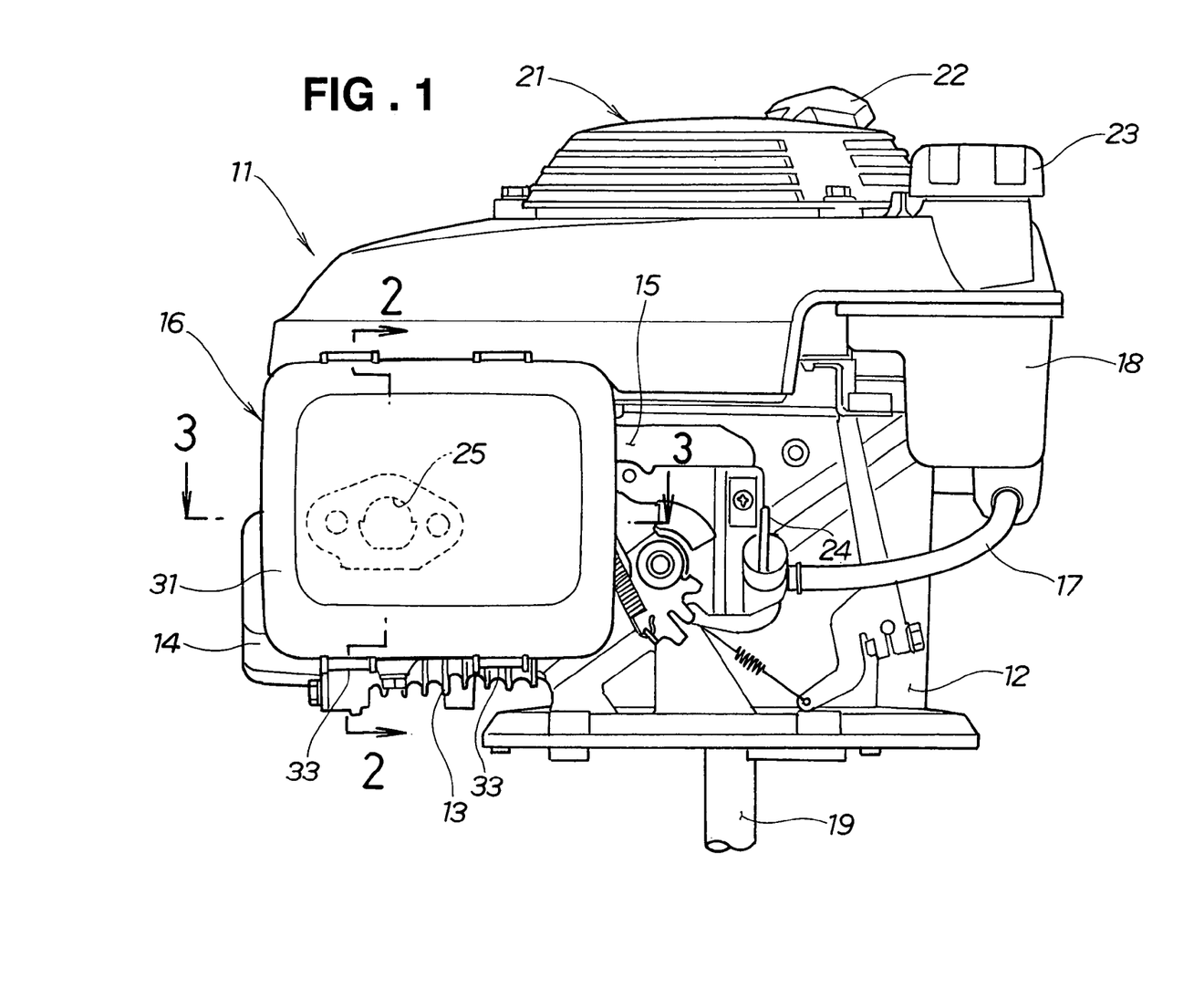
FIG. 1 is a side view illustrating a multi-purpose engine employing an air cleaner according to the present invention.

Reference is made initially to FIG. 1 showing a multi-purpose engine 11 employing an air cleaner according to the present invention. As shown, the engine 11 includes a crankcase 12, a cylinder block 13 being in one piece with the crankcase 12, a cylinder head 14 mounted to the cylinder block 13, a carburetor 15 disposed sidewardly of the cylinder head 14 for mixing fuel with air at a predetermined ratio and supplying the mixture to the engine, an air cleaner 16 mounted to the carburetor 15 for filtering dust and dirt out of air drawn into the carburetor, and a fuel tank 18 for supplying fuel through a fuel pipe 17 to the carburetor 15.

In the Figure, reference numeral 19 designates a power output shaft projecting downwardly. Reference numeral 21 denotes a recoil starter. A starter grip 22 is mounted to the recoil starter 21 via a rope, not shown. Reference numeral 23 denotes a filler cap while 24 denotes a fuel cock.

Figure 2:
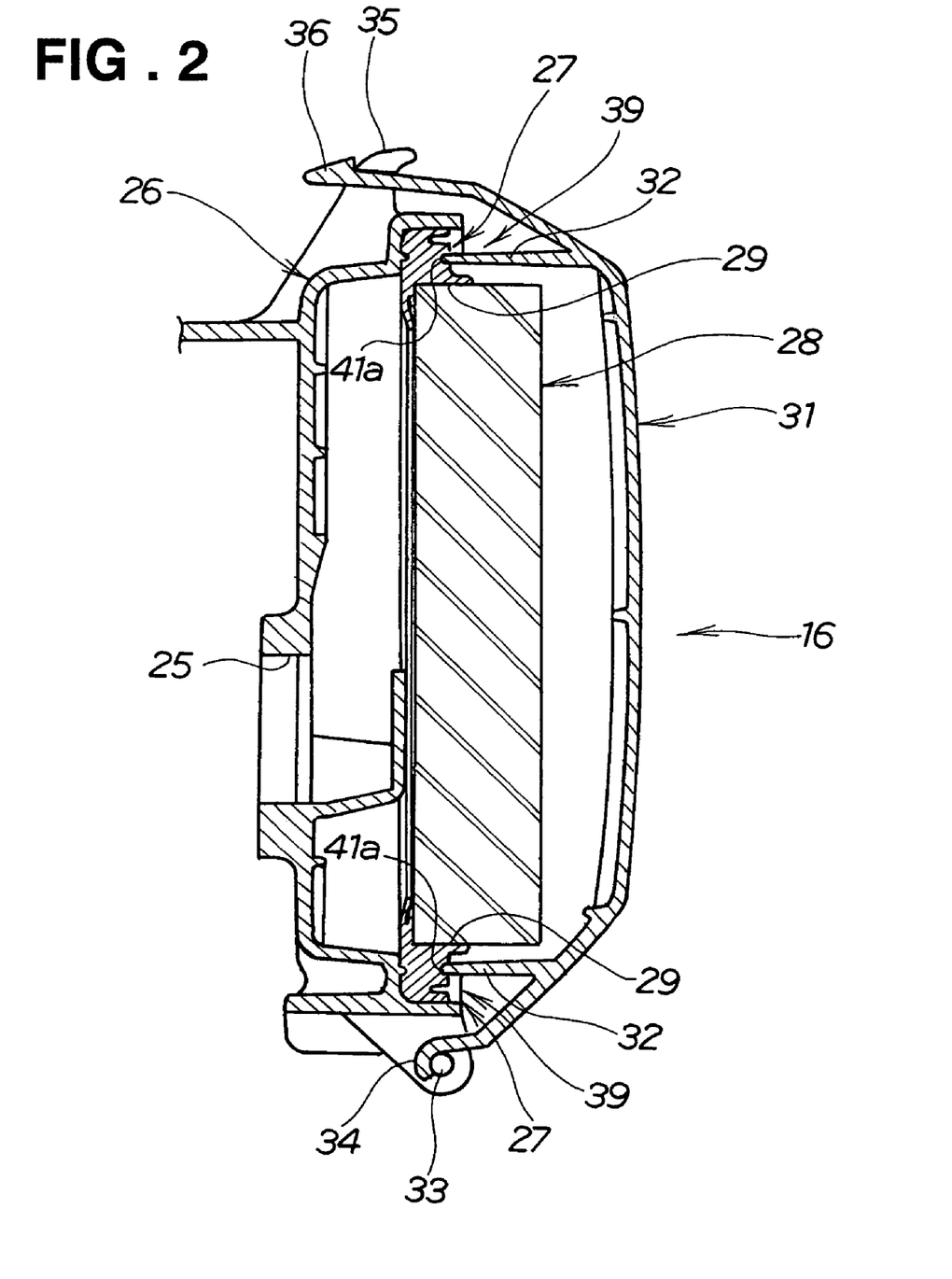
FIG. 2 is a cross-sectional view taken along line 2-2 of FIG. 1.

Turning now to FIG. 2, the air cleaner 16 is comprised of a casing body 26 having an opening 25 communicating with the carburetor 15, a sealing frame 27 fitted within the casing body 26, a filter 28 disposed inside the sealing frame 27, and a cover 31 for protecting the filter. 28. The sealing frame 27 is made of an elastic material such as rubber.

The filter 28 is placed in tight contact with an inner peripheral surface 29 of the sealing frame 27 and remains unitarily with the sealing frame 27. The unitarily joined sealing frame 27 and filter 28 are fitted in a fitting part 39 of the casing body 26 and is enclosed by the cover 31.

Inside the cover 31, an inner peripheral wall 32 extends all around for holding the sealing frame 27 and filter 28 against the casing body 26. By pressing the sealing frame 27 against the casing body 26 with the inner peripheral wall 32, the sealing frame 27 is placed in tight contact with the casing body 26.

Disposed below the casing body 26 is a hinge shaft 33 with which a hinge bracket part 34 provided on the cover 31 rotationally engages. Thus, the cover 31 is supported rotatably with respect to the casing body 26 via the hinge shaft 33 and the hinge bracket 34.

A to-be-engaged part 35 is provided above the casing body 26 while an engaging part 36 is provided above the cover 31. The engaging part 36 is designed to releasably engage with the to-be-engaged part 35.

In this way, the cover 31 is separably coupled with the casing body 26. Separation of the cover 31 from the casing body 26 makes it possible to take out the filter 28 for the sake of maintenance.

Since the filter 28 and the sealing frame 27 are held tight against each other unitarily, there is no fear that dusty air will leak from between the filter 28 and the sealing frame 27.

Figure 3:
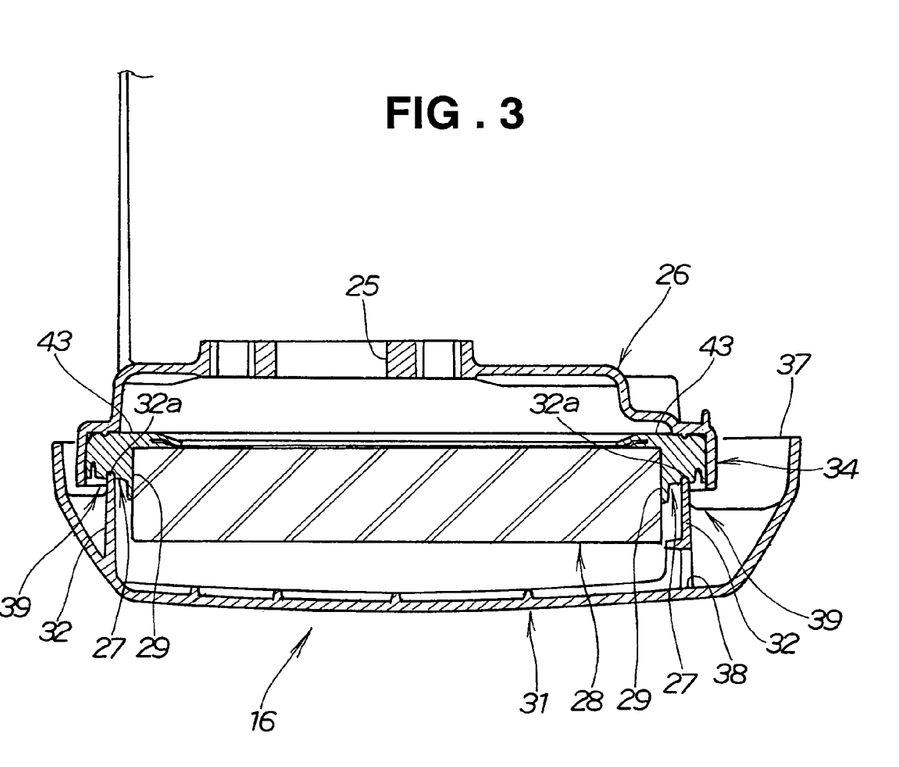
FIG. 3 is a cross-sectional view taken along line 3-3 of FIG. 1.

Referring now to FIG. 3, the cover 31 has an air intake opening 37. Outside air is introduced inside through the air intake opening 37. Outside air taken in through the air intake opening 37 is directed to the filter 28 through a communication hole 38 formed in a part of the inner peripheral wall 32.

Figure 4A:
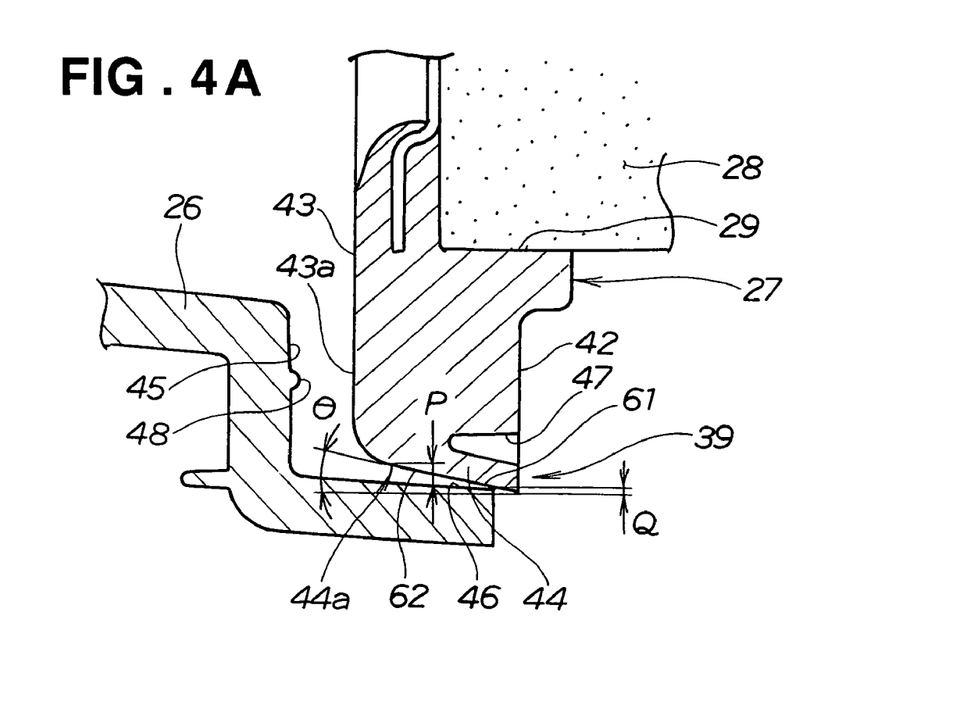
FIG. 4A and FIG. 4B are partially enlarged sectional view showing a relationship between a casing body and a sealing frame shown in FIG. 2.
Figure 4B:
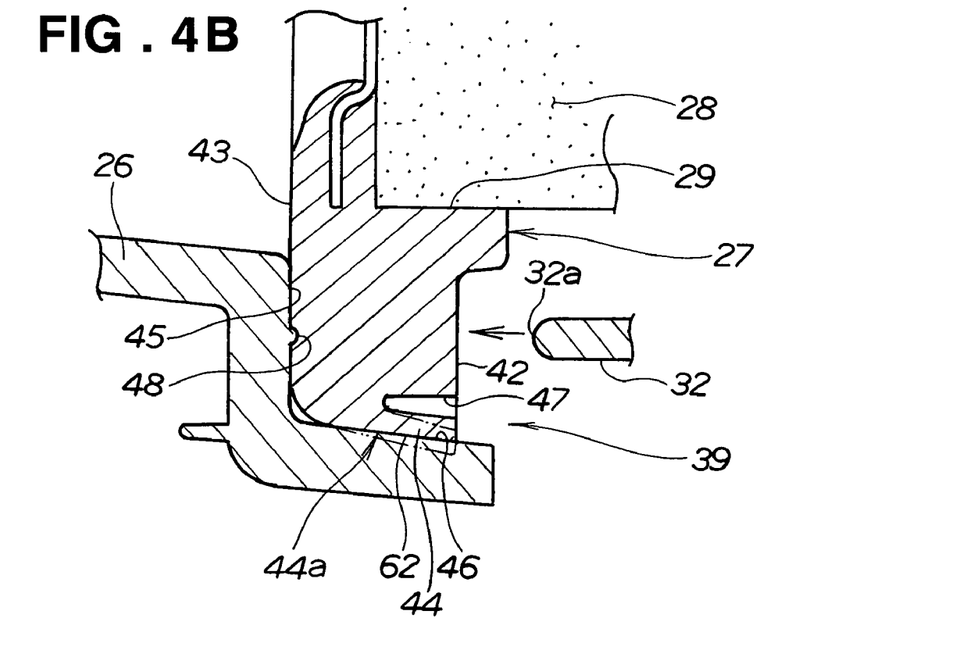

Next, reference is made to FIGS. 4A and 4B showing a relationship between the casing body 26 and the sealing frame 27.

As shown in FIG. 4A, the sealing frame has a plurality of grooves 47 formed on a front surface 42 along a circumference thereof. The grooves 47 are tapered a predetermined angle θ with respect to a direction in which the sealing frame 27 is inserted into the casing body 26. The grooves 47 do not extend in all directions on an entire periphery of the front surface 42 of the sealing frame 27 but are spaced from each other such that they have desired lengths. Between the grooves 47 there are formed ribs for rigidity control. The grooves 47 are positioned radially outwardly of a distal end 32a of the inner peripheral surface 32.

Apart from the front surface 42, the sealing frame 27 has a rear surface 43 and an outer peripheral part 44. For allowing fitting of the sealing frame 27 in the casing body 26, the casing body 26 includes the fitting part 39 which has an inner wall surface 46 in contact with an outer peripheral surface 44a of the outer peripheral part 44 and a bearing surface 45 in contact with a peripheral edge 43a of the rear surface 43 of the sealing frame 27.

The outer peripheral surface 44a of the fitting part 39 is tapered as at 62 such that an outer periphery of the rear surface 43 of the 15 sealing frame 27 becomes a length P smaller than an inlet part 61 of the fitting part 39 while an outer periphery of the front surface 42 of the sealing frame 27 becomes a length Q larger than the inlet 61 of the fitting part 39. Namely, the rear surface 43 of the sealing frame 27 has a diameter smaller than a diameter of the inlet part 61 of the fitting part 39 while the front surface 42 of the sealing frame 27 has a diameter larger than a diameter of the inlet part 61 of the fitting part 39.

With the diameter of the rear surface 43 of the sealing frame 27 made smaller than the diameter of the inlet part 61 of the fitting part 39, it becomes possible to easily engage the sealing frame 27 within the casing body 26. With the diameter of the front surface 42 of the sealing frame 27 made larger than the diameter of the inlet part 61 of the fitting part 39, it becomes difficult for the sealing frame 27 to come off from the casing body 26. Further, provision of the grooves 47 makes it possible for the outer peripheral part 44 of the sealing frame 27 to easily shrink to the size of the inlet part 61 of the fitting part 39 to produce a spring effect.

As shown in FIG. 4B, the sealing frame 27 and the filter 28 are engaged in the fitting part 39 of the casing body 26. The rear surface 43 of the sealing frame 27 comes into abutting engagement with the bearing surface 45 while the outer peripheral part 44 of the sealing frame 27 deforms in the direction of the grooves 47. Since the outer peripheral surface 44a of the sealing frame 27 is tapered as at 62, the sealing frame 27 is held against the casing body 26 with increased tightness.

Then, the distal end 32a of the inner peripheral wall 32 of the cover 31 (see FIG. 2) is brought into pressing contact with the front surface 42 of the sealing frame 27 while the rear surface 43 of the sealing frame 27 unified with the filter 28 is brought into pressing contact with the bearing surface 45 of the casing body 26. As a result, the outer peripheral surface 44a of the sealing frame 27 is placed in tight contact with the inner wall surface 46 of the casing body 26. Because the sealing frame 27 is elastic and has the grooves 47 formed in the front surface 42 thereof and opening along the outer peripheral part 44, the outer peripheral part 44 bends inwardly to bring the outer peripheral surface 44a into tight contact with the inner wall surface 46.

Further, to increase sealing capability to prevent outside dust from entering the opening 25 (see FIG. 2), the casing body 26 has a ridge 48 extending around the entire periphery of the bearing surface 45 thereof. The distal end 32a of the inner peripheral wall 32 is positioned in opposed relation to the ridge 48 which in turn is placed in confronting relation to the peripheral edge 43a at the rear surface 43 of the sealing frame 27. By pressing the rear surface 43 of the sealing frame 27 against the ridge 48, the ridge 48 bites into the elastic sealing frame 27 to provide an increased sealing effect. The filter 28, unitarily coupled with the sealing frame 27, is retained by the casing body 26.

Figure 5A:
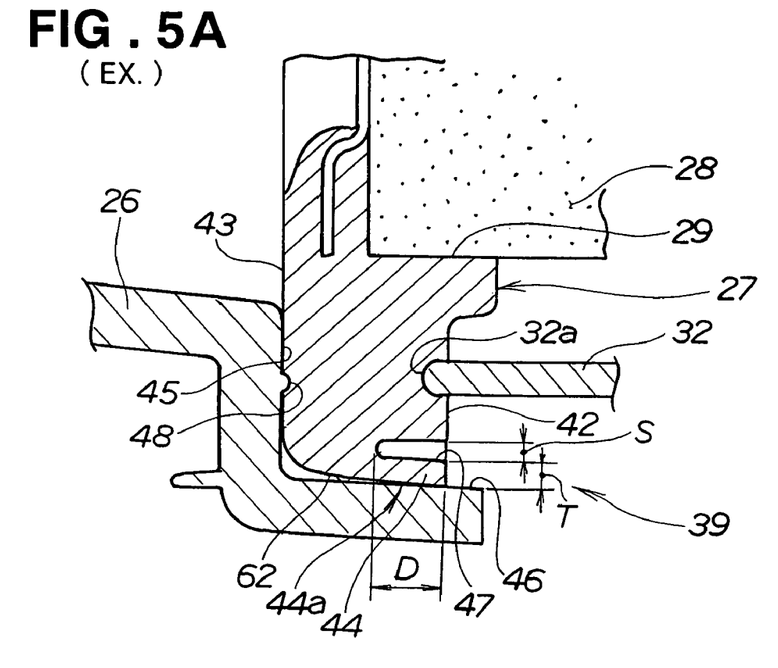
FIG. 5A and FIG. 5B respectively illustrate in partially enlarged section a relationship between the casing body and the sealing frame according to an example or embodiment of the present invention and a relationship between a casing body and a sealing frame according to a comparison example.
Figure 5B:
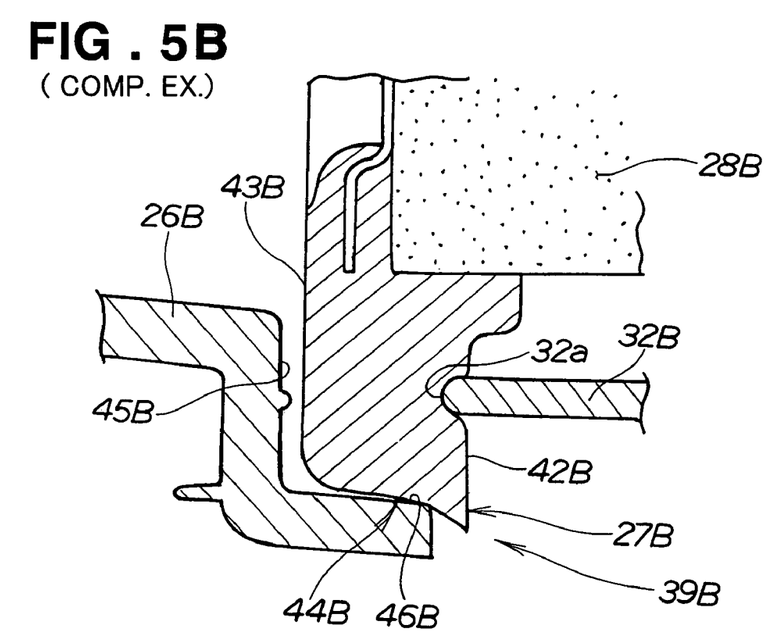

Reference is made next to FIGS. 5A and 5B illustrating an example sealing frame 32 of this invention and a sealing frame 27B as a comparison example, respectively.

In the inventive arrangement as shown in FIG. 5A, the distal end 32a of the inner peripheral wall 32 presses and bites into the front surface 42 of the elastic sealing frame 27 to thereby fix the sealing frame 27 and the filter 28 unitarily coupled therewith against the casing body 26. The grooves 47 formed in the front surface 42 of the sealing frame 27 have a depth D. The outer peripheral part 44 of the sealing frame 27 has a thickness T. That is, the grooves 47 are at a position spaced a distance T from the outer peripheral surface 44a. As a result, the outer peripheral part 44 can easily deform inwardly.

To tightly contact the outer peripheral surface 44a and the inner wall surface 46 with each other, the front surface 42 of the sealing frame 27 is thus notched to provide the grooves 47 of the depth D.

When the sealing frame 27 is engaged in the fitting part 39 of the casing body 26, the grooves 47 have a width S. The grooves 47 have an angle of inclination 0 (FIG. 4A), a degree of inclination of which angle corresponds to an amount in which the outer peripheral part 44 can bend. In other words, the outer peripheral part 44 of the sealing frame 27 takes the form of a cantilever having a length D and a thickness T and functions as a leaf spring. The outer peripheral part 44 of length D and thickness T bends to cause the outer peripheral surface 44a of the outer peripheral part 44 to tightly contact the inner wall surface 46.

The outer peripheral surface 44a of the sealing frame 27 is tapered toward a direction of engagement.

By thus forming the grooves 47 of depth D and slanting the outer peripheral part 44, it becomes possible to easily insert the sealing frame 27 as deep as the bearing surface 45 past the fitting part 39 of the casing body 26.

In the bearing surface 45 of the casing body 26, the ridge 48 is provided in opposed relation to the distal end 32a of the inner peripheral wall 32. The ridge 48 is positioned closer to the filter 28 than the grooves 47. As the cover 31 is mounted to the casing body 26, the ridge 48 bites into the sealing frame 27 as deep as its bulge to thereby prevent leakage of dusty air to downstream of an intake air stream.

Even when the bearing surface 45 of the fitting part 39 warps due to dimension errors of the casing body 26, the sealing frame 27 can be surely engaged in the fitting part 39 because the outer peripheral part 44 deforms to obviate the dimension errors, bringing the sealing frame 27 into tight contact with the casing body 26.

Reference is now made to FIG. 5B showing a sealing frame 27B as a comparative example, without grooves formed in a front surface 42B thereof. When the sealing frame 27B, which is made from an elastic material, is engaged in a fitting part 39B of a casing body 26B, a distal end 32a of an inner peripheral wall 32B presses and bites into a front surface 42B of the sealing frame 27B to thereby retain a filter 28B unitarily coupled with the sealing frame 28B.

However, the sealing frame 27B of the comparison example has no grooves. As a result, as the sealing frame 27B is press-fit into the fitting part 39B of the casing body 26B, the sealing frame 27B does not deform sufficiently. Consequently, continued pressing of the front surface 42B of the sealing frame 27B with the distal end 32a of the inner peripheral wall 32B will not end up engaging the sealing frame 27B in the fitting part 39B sufficiently, thus failing to place the rear surface 43B of the sealing frame 27B in tight contact with the bearing surface 45B and to place the outer peripheral surface 44B of the sealing frame 27B in tight contact with the inner wall surface 46B of the casing body 26B.

When the sealing frame 27B is not held in tight contact with the casing body 26B, a gap arises between the sealing frame 27B and the casing body 26B, resulting in insufficient sealing.

As thus far discussed, because the sealing frame 27 of the present embodiment has the grooves 42 extending along the outer peripheral part 44 and opening on the front surface 42, upon engagement of the sealing frame 27 in the casing body 26, the outer peripheral part 44 bends and moves on the inner wall surface 46 of the casing body 26. Consequently, the outer peripheral surface 44a of the sealing frame 27 is placed in tight contact with the inner wall surface 46 of the casing body 26 while the rear surface 43 of the sealing frame 27 is placed in tight contact with the bearing surface 45 of the fitting part 43.

Although the air cleaner of the present invention has been described as it is applied to a general-purpose engine, it may also be applied to a two-wheeled vehicle, as well as to automobiles.

Obviously various minor changes and modifications of the present invention are possible in the light of the above teaching. It is therefore to be understood that within the scope of the appended claims the invention may be practiced otherwise than as specifically described.

What is claimed is:

1. An air cleaner comprising:
    a casing body having an opening that communicates with a carburetor, the casing body including a fitting part having an inner wall surface and a bearing surface;
    a sealing frame that is inserted into the casing body and engages the fitting part of the casing body, the sealing frame having an outer peripheral part with an outer peripheral surface that is held in contact with the inner wall surface of the fitting part, a rear surface that is held in contact with the bearing surface of the fitting part, a front surface, and a groove formed in the front surface along a circumference thereof;
    a filter disposed internally of the sealing frame; and
    a cover that covers the filter and the sealing frame.

2. An air cleaner according to claim 1; wherein the outer peripheral surface of the outer peripheral part of the sealing frame is tapered such that the rear surface of the sealing frame has a diameter smaller than a diameter of an inlet part of the fitting part and the front surface of the sealing frame has a diameter larger than a diameter of the inlet part of the fitting part.

3. An air cleaner according to claim 1; wherein the sealing frame is made of an elastic material.

4. An air cleaner according to claim 1; wherein the sealing frame is made of an elastic material so that when the sealing frame is inserted into the casing body and is engaged with the fitting part of the casing body, the rear surface of the sealing frame comes into abutting engagement with the bearing surface of the fitting part while the outer peripheral part of the sealing frame deforms in the direction of the groove.

5. An air cleaner according to claim 4; wherein the groove is tapered at a predetermined angle with respect to a direction in which the sealing frame is inserted into the casing body.

6. An air cleaner according to claim 5; wherein the outer peripheral surface of the outer peripheral part of the sealing frame is tapered at the predetermined angle.

7. An air cleaner according to claim 1; wherein the cover has an inner peripheral wall with a distal end that is brought into pressing contact with the front surface of the sealing frame.

8. An air cleaner according to claim 1; wherein the sealing frame is made of an elastic material; and wherein the bearing surface of the casing body has a ridge that bites into the elastic sealing frame.

9. An air cleaner according to claim 8; wherein the cover has an inner peripheral wall with a distal end that is brought into pressing contact with the front surface of the sealing frame so that the distal end is positioned in opposed relation to the ridge.

10. An air cleaner according to claim 1; wherein the groove extends a preselected distance into the sealing frame from the front surface thereof; and wherein the outer peripheral part of the sealing frame has a length equal to the preselected distance.

11. An air cleaner comprising:
    a casing body having an inner wall surface and a bearing surface; and an elastic sealing frame that is inserted into the casing body, the elastic sealing frame having an inner peripheral surface configured to support a filter in contact therewith so that the filter remains unitarily with the elastic sealing frame, an outer peripheral part with an outer peripheral surface in contact with the inner wall surface of the casing body, a rear surface in contact with the bearing surface of the casing body, a front surface, and at least one groove formed in the front surface.

12. An air cleaner according to claim 11; wherein the the outer peripheral part of the elastic sealing frame is in a deformed state in the direction of the groove.

13. An air cleaner according to claim 11; wherein the groove is tapered at a predetermined angle with respect to a direction in which the elastic sealing frame is inserted into the casing body.

14. An air cleaner according to claim 13; wherein the outer peripheral surface of the outer peripheral part of the elastic sealing frame is tapered at the predetermined angle.

15. An air cleaner according to claim 11; further comprising a cover that covers the filter and the elastic sealing frame.

16. An air cleaner according to claim 15; wherein the cover has an inner peripheral wall with a distal end that is brought into pressing contact with the front surface of the elastic sealing frame.

17. An air cleaner according to claim 11; wherein the bearing surface of the casing body has a ridge that bites into the elastic sealing frame.

18. An air cleaner according to claim 17; wherein the cover has an inner peripheral wall with a distal end that is brought into pressing contact with the front surface of the elastic sealing frame so that the distal end is positioned in opposed relation to the ridge.

19. An air cleaner according to claim 11; wherein the groove extends a preselected distance into the elastic sealing frame from the front surface thereof; and wherein the outer peripheral part of the elastic sealing frame has a length equal to the preselected distance.

20. An air cleaner according to claim 11; wherein the outer peripheral part of the elastic sealing frame forms an elastic cantilever structure that bends to cause the outer peripheral surface of the outer peripheral part to tightly contact the inner wall surface of the casing body.

* * * * *